United States Patent
Ostojic

(10) Patent No.: US 8,918,787 B2
(45) Date of Patent: Dec. 23, 2014

(54) EXECUTING PROCESSES USING A PROFILE

(75) Inventor: Dejan Ostojic, London (GB)

(73) Assignee: Nokia Corporation, Espoo (FI)

( * ) Notice: Subject to any disclaimer, the term of this patent is extended or adjusted under 35 U.S.C. 154(b) by 1192 days.

(21) Appl. No.: 12/518,105

(22) PCT Filed: Dec. 7, 2007

(86) PCT No.: PCT/GB2007/004695
§ 371 (c)(1),
(2), (4) Date: Dec. 16, 2010

(87) PCT Pub. No.: WO2008/068505
PCT Pub. Date: Jun. 12, 2008

(65) Prior Publication Data
US 2011/0265089 A1    Oct. 27, 2011

(30) Foreign Application Priority Data
Dec. 7, 2006    (GB) .................................. 0624478.4

(51) Int. Cl.
*G06F 9/46*    (2006.01)
*G06F 9/48*    (2006.01)

(52) U.S. Cl.
CPC ............ *G06F 9/4881* (2013.01); *G06F 9/4818* (2013.01)
USPC .......................................... 718/103; 718/104

(58) Field of Classification Search
None
See application file for complete search history.

(56) References Cited

U.S. PATENT DOCUMENTS

| | | | |
|---|---|---|---|
| 6,457,008 B1 | 9/2002 | Rhee et al. | |
| 7,581,224 B2 * | 8/2009 | Romero | 718/104 |
| 2002/0053684 A1 * | 5/2002 | Chauvel et al. | 257/200 |
| 2003/0120705 A1 | 6/2003 | Chen et al. | |
| 2004/0203768 A1 * | 10/2004 | Ylitalo et al. | 455/435.1 |
| 2006/0007901 A1 * | 1/2006 | Roskowski et al. | 370/338 |
| 2008/0056071 A1 * | 3/2008 | Burtner et al. | 368/28 |

FOREIGN PATENT DOCUMENTS

| | | |
|---|---|---|
| EP | 1096360 A | 5/2001 |
| EP | 1630671 A | 3/2006 |
| GB | 2391972 A | 2/2004 |
| GB | 2403823 A | 1/2005 |
| WO | 02091180 A | 11/2002 |
| WO | 2004095248 A2 | 11/2004 |

OTHER PUBLICATIONS

Great Britain Search Report for Application No. 0624478.4, dated Mar. 20, 2007, 4 pages.
International Search Report and Written Opinion of the International Searching Authority for PCT Application No. PCT/GB2007/004695, dated Apr. 28, 2008, 14 pages.
Candea et al., "Vassal: loadable scheduler support for multi-policy scheduling", Proceedings of the Usenix Windows NT Symposium, Aug. 3, 1998, pp. 57-166.

\* cited by examiner

*Primary Examiner* — Kenneth Tang
(74) *Attorney, Agent, or Firm* — Alston & Bird LLP

(57) ABSTRACT

A management entity for managing the execution priority of processes in a computing system, the management entity being configured to, in response to activation of a pre-stored profile defining execution priorities for each of a plurality of processes, cause those processes to be executed by the computing system in accordance with the respective priorities defined in the active profile.

12 Claims, 1 Drawing Sheet

EXECUTING PROCESSES USING A PROFILE

RELATED APPLICATION

This application is a National Stage Entry of International Application No. PCT/GB2007/004695 filed on Dec. 7, 2007 which claims priority to GB Application No. 0624478.4 filed Dec. 7, 2006.

TECHNICAL FIELD

Embodiments of this invention relate to the use of profiles to configure resource usage on a device.

BACKGROUND OF THE INVENTION

Most devices have a set of resources that is limited in some way. For example, a device such as a mobile phone or a notebook PC (personal computer) may have limited energy available from its battery, limited processing power available from its CPU (central processing unit) and limited memory available for storage of program data. In order to provide the user with the best service from the device it is desirable to manage the available resources so they can be directed to the functions that are most important to the user at any particular time.

SUMMARY OF THE INVENTION

This issue is currently addressed in a number of ways. Notebook PCs normally allow the user to configure energy-usage profiles that can be adopted in appropriate situations. These might include a "mains power" profile in which all functions of the PC operate at full power, and a "battery power" mode in which the PC's display is dimmed and its CPU is clocked at a lower speed so as to reduce power consumption. These profiles can typically affect the operation of hardware such as the display, CPU clock rate, hard disc spin-down delay and suspend delay. Some mobile phones have a "flight-safe" mode in which the RF (radio frequency) transceiver of the phone is disabled. This has a similar effect: reducing the power consumption of certain hardware of the device. These methods allow the user to alter the capabilities of the device at any particular time, but they do not provide an enhanced service to the user without a corresponding increase in hardware functionality and accordingly in power consumption.

Second, PCs normally allow a user to manually allocate different priorities to different processes that are running, thereby altering the proportion of CPU time that is dedicated to each of the processes. This may be done at a low interface level, by the user altering an individual process's CPU priority, or at a higher interface level by the user unloading an individual process or configuring it to run in the background. In these ways the user can prioritise the processes that are more important to him so that he gets the best service from the device. By prioritising a particular process that is important to him a user can obtain an enhanced service with no alteration in hardware functionality. However, altering the priority of individual processes can be a time-consuming operation that requires accessing detailed operating system settings. Also giving a user access to the priorities of individual processes can jeopardise the stability of the system because some processes are critical to the operation of the device.

There is a drive to increase the range of services available from devices. To support these services increasing demands are being made on devices' processing power and memory. This is particularly so with power-hungry applications such as games, TV reception/rendering and movie and audio players. In the communications field, the popularity of push-based applications is particularly significant because these require a user's device to remain in a state ready to receive communications that might be initiated from a network. If a device is not able to handle the demands for resources that are placed on it then its performance will suffer. This could manifest as glitches during playing games or when watching or listening to audio or video content, or as delays in receiving important communications such as emails, SMS messages and VoIP calls.

There is a need for an improved way of allocating resources in a device. Such a way would preferably enable a user to more readily perform the allocation. Such a way would preferably enable a user to obtain enhanced perception of the device's operation without altering the hardware capabilities of the device.

According to the present invention there is provided a management entity for managing the execution priority of processes in a computing system, the management entity being configured to, in response to activation of a pre-stored profile defining execution priorities for each of a plurality of processes, cause those processes to be executed by the computing system in accordance with the respective priorities defined in the active profile.

The management entity may be configured to cause processes to be executed in accordance with the respective priorities defined in the active profile by: if a process is defined in the active profile as having a relatively low priority, causing that process not to be loaded in working memory of the computing system; and if a process is defined in the active profile as having a relatively high priority, causing that process to be loaded in working memory of the computing system.

The management entity may be configured to cause processes to be executed in accordance with the respective priorities defined in the active profile by causing a processing unit of the computing system to allocate processing time to each of the processes in accordance with the respective priority of that process.

The management entity may be configured to activate a pre-stored profile automatically in response to detecting the occurrence of a pre-determined condition in the computing system.

The management entity may be configured to activate a pre-stored default profile automatically in response to detecting that the occurrence of the said pre-determined condition has ended.

The management entity may be capable of providing a user interface whereby a user of the computing device can define execution priorities for each of a plurality of processes and store them as a profile for subsequent activation.

The said user interface may comprise a list of processes (e.g. on a display of a device that supports the entity and the processes) and a respective positionally variable control associated with of the processes, the position of each positionally variable control defining the execution priority for the respective process. Each positionally variable control may be a slider, a rotatable marker or the like. Its position is preferably variable on a display of the device.

The management entity may be capable of providing a user interface whereby a user of the computing device can activate a selected pre-stored profile.

The management entity may be capable of monitoring the operation of the computing system and in dependence on the results of that monitoring storing a further profile defining execution priorities for each of a plurality of processes.

The management entity may be an operating system or a part of an operating system.

According to a second aspect of the invention there is provided a computing device comprising a management entity having any of the features set out above.

The computing device preferably comprises a memory storing a plurality of profiles, each of the profiles defining execution priorities for each of a plurality of processes.

The processes may include: a first user process capable of real-time interaction with a user of the computing device; a second user process capable of real-time interaction with a user of the computing device; and a communication process capable of supporting communication by the computing device with a remote device. In that case preferably at least one of the profiles defines execution priorities such that the first user process and the communication process have higher execution priorities than the second user process.

The processes may include: a user process capable of real-time interaction with a user of the computing device; a first communication process capable of supporting communication by the computing device with a remote device; and a second communication process capable of supporting communication by the computing device with a remote device. In that case preferably at least one of the profiles defines execution priorities such that the user process and the first communication process have higher execution priorities than the second communication process.

The or each user process may be is for gaming or office applications. The communication process may be for supporting one or more of circuit switched phone communications, packet switched phone communications, voice-over-internet-protocol communications, short message communications, multimedia message communications and email communications. Preferably the communication process supports push services.

The computing device may be a phone.

According to a third aspect of the present invention there is provided a method for managing the execution priority of processes in a computing system by means of a management entity, the method comprising: in response to activation of a pre-stored profile defining execution priorities for each of a plurality of processes, causing those processes to be executed by the computing system in accordance with the respective priorities defined in the active profile.

According to a fourth aspect of the present invention there is provided an operating system comprising a management entity having any of the features set out above.

BRIEF DESCRIPTION OF THE DRAWINGS

The present invention will now be described by way of example with reference
to the accompanying drawing. In the drawing.

DETAILED DESCRIPTION OF THE DRAWINGS

Figure 1:
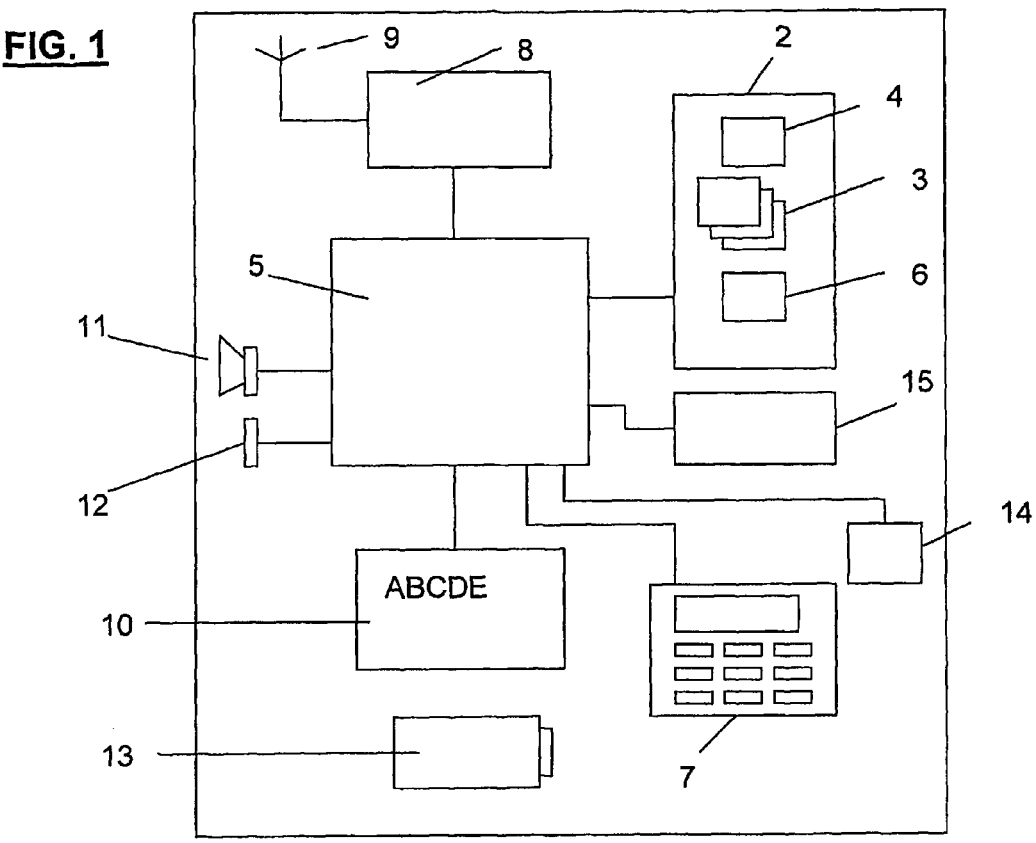
FIG. 1 is a schematic diagram of a mobile phone.

In the mobile phone 1 of FIG. 1 a non-volatile memory 2 stores instructions defining application programs (shown schematically at 3) and an operating system (shown schematically at 4). The mobile phone has a CPU 5 which can execute the instructions stored in memory 2. The phone is configured in such a way that the application programs are executed as respective processes under the control of the operating system. The non-volatile memory also stores data (shown schematically at 6) defining a series of resource usage profiles. Each resource usage profile includes an indication of the execution priorities to be allocated to each of two or more of the application programs. The mobile phone has a keypad 7 by which a user can command the phone to activate one of the profiles. When a profile is activated the operating system prioritises the execution of each of the programs identified in that profile in accordance with the respective execution priority as indicated in that profile. In this way a user can readily configure the mobile phone to prioritise one or more applications in preference to one or more other applications. By prioritising one or more applications that he wants to use at the expense of one or more that are not currently needed the user can gain an enhanced perceived performance from the phone without altering its hardware capabilities. The user can alter the priorities of multiple programs relative to multiple other programs simply by selecting a desired pre-stored profile, and without altering the hardware capabilities of the device.

The mobile phone has an RF transceiver 8 coupled to an antenna 9, by means if which it can transmit and receive data according to a mobile phone radio protocol. The transceiver is coupled to the CPU. Data received by the transceiver is passed to the CPU and data can be passed from the CPU to the transceiver for transmission. The mobile phone has a display 10 for displaying data to a user, a loudspeaker 11 for producing sound (e.g. to reproduce audio data received through the transceiver 8) and a microphone 12 for receiving sound (e.g. to capture audio data that is subsequently to be transmitted by the transceiver 8). The mobile phone is powered by a battery 13.

The prioritisation of different programs can be performed in a number of ways, as appropriate to the CPU and the operating system of the device. A first method is for the operating system to arrange that the only programs that are loaded into working memory for execution are those programs identified for execution in the currently active profile. Once those programs are loaded they can be scheduled for execution by the CPU as normal. This method has the advantage that working memory can be freed up by absence of the unwanted programs from working memory. The working memory may be on the CPU or in RAM (random access memory) 15 coupled to the CPU. If a program is already loaded when a profile is activated that calls for that program to be in a loaded state then the profile management entity need take no action to load it. Similarly, if a program is not loaded when a profile is activated that calls for that program not to be in a loaded state then the profile management entity need take no action to unload it. The profile management entity simply needs to ensure that the load state of each program accords with the profile.

A second method is for the operating system to schedule loaded programs for execution by the CPU in accordance with priorities identified in the currently active profile. Programs that have higher priorities in the current profile are given relatively more CPU time than programs that have lower priorities. This method has the advantages that it allows finer control over the priority that can be given to each program, and that the priority of a program can be increased instantaneously without any delay whilst it is loaded into working memory.

A third method is for the operating system to maintain a list of which of the currently-loaded programs are to be granted CPU time in accordance with the current profile. That list can be altered independently of which programs are currently loaded.

The second method will be discussed by way of example below.

Table 1 below shows examples of profiles that may be stored at 6 in the mobile phone of FIG. 1.

TABLE 1

| Profile no. | Application program/process | | | | |
|---|---|---|---|---|---|
| | Email handling | Game | SMS handling | VoIP handling | Internet protocol connection |
| 1 | 50 | | | | 50 |
| 2 | 0 | 90 | 10 | 0 | 0 |
| 3 | 0 | 80 | 0 | 10 | 10 |
| 4 | 0 | 0 | 0 | 10 | 10 |
| 5 | 1 | 80 | 1 | 10 | 10 |
| 6 | 20 | 20 | 20 | 20 | 20 |

In its default mode the operating system allocates equal priority, and hence an equal proportion of processor time, to each process. However, when one of the stored resource allocation profiles is activated the operating system allocates processor time to the processes in accordance with that profile.

In each profile a priority is stored against one or more application programs. If no priority is stored against a program (as in profile 1) the priority of that program in that profile is considered to be zero. This feature means that pre-existing profiles remain valid when further applications are installed on the phone, although a default profile (see below) may need to be altered. When a particular profile is active the proportion of available CPU time allocated to a program is arranged to be at least approximately equal to the numerical priority of that program in that profile divided by the total numerical priorities of all programs in that profile. The allocation may need to be approximate because CPU time may additionally need to be spent on management activities such as execution of the operating system kernel, because the operating system might not have complete flexibility over the division of time between applications, and because some processes might not require all the processing time that is available to them. The allocation of time to processes is described in more detail below.

i. Profile 1 of table 1 involves the allocation of substantially equal amounts of processor time to email communication handling and internet protocol connection applications. This profile may be useful if a user is in a meeting and wants only to accept emails (e.g. from his colleagues). If the user activates profile 1 the appropriate applications will be active whilst other applications/services will be stopped and will not use the phone's resources. As indicated above, the non-prioritised applications could be unloaded from working memory to free up resources.

Profile 2 of table 1 involves the allocation of most processor time to a game application and some processor time to a SMS (short message service) application. This profile may be useful if a user is playing a favourite power-hungry game but is interested in receiving SMS messages. If the user activates profile 2 then resources other than those required to support those services will be freed, saving CPU resources.

Profile 3 of table 1 involves the allocation of most processor time to a game application and some processor time to a VoIP application and to an IP (internet protocol) application. This profile may be useful if the user is playing an online game, but is waiting for an important VoIP call. VoIP and the internet connection to support it are maintained, whilst most processor time is used to support the game. In a situation such as this it may be desirable for the device to automatically enter another profile when a VoIP call arrives, to ensure that sufficient processor time is allowed for supporting the active call. Thus, the phone could automatically enter profile 4 when a call arrives. In general, the phone could be configured to, when in a first profile, switch automatically to a second profile when a pre-defined condition is met.

Profile 5 is an alternative to profile 3 for use in similar circumstances. In profile 5 a small amount of time is allocated to other processes. This allows events associated with those processes to be detected when they have processor time. If an event is detected that means that the process should be given greater priority then the device can automatically switch to another profile. The device may be configured to automatically return to a default profile or to the previously-selected profile when the event ceases.

Profile 6 is an example of a default profile that could be adopted if the user does not specifically indicate that another profile should be adopted, or if the conditions that caused the device to select another profile cease.

As outlined above, the operating system is responsible for allocating processor time to processes in accordance with the profiles. It may do this in a number of ways. In the most basic method it may allocate to each process a proportion of the total CPU instruction cycles that are available to the application processes, that proportion being in accordance with the priority allocated to that process in the active profile. For example, when profile 4 is active, 50% of available CPU instruction cycles would be allocated to VoIP communication handling and 50% to the internet protocol connection. The cycles may be allocated singly, or in blocks of multiple cycles. The latter method may reduce the need for context switching. If a process does not require all the time that is available to it then preferably the remainder of its time is allocated to another of the processes. Other methods of allocating time that are known for multi-threaded environments may be used. The processor may have multiple cores, and processor time can be allocated between them in a similar way.

The phone may have RAM 15 into which program code is loaded when it is to be run. The use of profiles as described above allows a program or set of programs to be de-prioritised to occupy no or very little CPU time whilst they remain loaded in RAM, and thus without them being closed. This allows them to be re-started very quickly when required.

One or more of the profiles may be pre-stored on the phone when it is manufactured or shipped to a customer. These may be stored in non-volatile memory as firmware.

Figure 2:
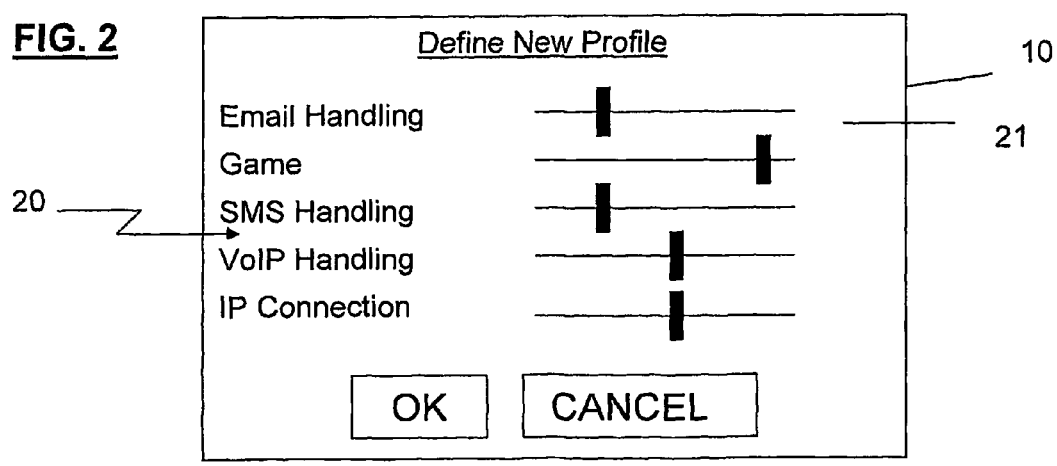
FIG. 2 illustrates a user interface screen view.

The phone may be capable of allowing a user to define their own profiles. The user may use the menu system of the phone to configure the proportion of time that is to be allocated to one or more processes in a user-defined profile. This allows the user to configure profiles for particular circumstances that he might anticipate. To set the priority of a process in a user-defined profile the user could enter a number representing its priority, as in table 1, or could be presented with a user-interface tool such as a slider which he can move to set the priority. A particularly convenient form of user interface is illustrated in FIG. 2. The display 10 of the device presents a list of programs 20 and a slider 21 for each one. When the user has set the positions of the sliders in accordance with his requirements (e.g. by using a pointing device or thumbwheel) he stores those settings as a profile, the priorities in the profile automatically reflecting the settings of the sliders. FIG. 2 illustrates slider settings for profile 5 of table 1.

The device could define resource usage profiles automatically, in dependence on a user's current or historical usage patterns. This activity is preferably but not necessarily performed by the operating system. For example, the device could observe that when a particular user is playing a game he rarely interrupts the game to answer incoming VoIP calls. In such a case the device may define a profile that prioritises the game at the expense of VoIP functionality and adopt that profile when the user is playing the game.

The user can use the menu system of the phone to select which profile he wants to activate. Alternatively, the phone could have a dedicated key 14 which can be used for selecting which profile is to be used. Pressing the key could cause the display to show a list of profiles that the user can scroll through in order to select one. The software that allows a user to configure and activate profiles could conveniently be part of the operating system, for instance as a policy manager entity of the operating system. Alternatively, it could be provided as an add-on module that is independent of the operating system. In addition, as described above the phone could select a profile automatically, based on current operating conditions. The entity that responds to the activation of a profile by causing processes to be scheduled, loaded and/or unloaded accordingly could be implemented in hardware, software or a combination of the two.

The phone may additionally allow the user to store a set of hardware profiles that determine which hardware on the device is to be active at any one time. For example, hardware profiles may involve turning off the transceiver 7 or reducing power to the display 10.

The resource profiles illustrated in table 1 may also have hardware configurations associated with them. For example, table 2 shows a simplified form of profile 2 from table 1 together with a similar profile 2b. In profile 2b all processor time is directed to the game and accordingly the transceiver can be turned off.

TABLE 2

| Profile no. | Application program/process | | | |
| --- | --- | --- | --- | --- |
| | Game | SMS communication handling | Transceiver | Display brightness |
| 2 | 90 | 10 | On | Medium |
| 2b | 100 | 0 | Off | High |

One particularly advantageous situation is where the profiles are used to distinguish between the priorities that are to be given to applications of a similar type, because the user wishes to concentrate resources on a single one of those. For example, the device may support applications that in normal operation respond to real-time input of the user: for example games and office applications such as word-processing applications. The device may also support applications that provide communication functionality of the device: for instance by interfacing between the transceiver and user-level applications. In such a situation a profile may usefully concentrate resources on one of the real-time applications and at least one of the communication applications at the expense of one or more of the other real-time applications and/or one or more of the communication applications. In this way the user can achieve enhanced performance from a preferred real-time application whilst maintaining the ability to receive communications via a preferred communication application. This is especially advantageous if the preferred communication application is responsive to push communications since it should then be given sufficient CPU time to check for such communications without it disrupting operation of the preferred real-time application.

Instead of or in addition to battery 13, the phone could be powered by another self-contained portable energy source such as a fuel cell, solar cell or mechanical generation means. It could be powered by mains electricity.

The invention is particularly applicable to communication devices such as mobile phones and especially smart phones. It can be applied to other devices, such as PDAs (personal digital assistants) and notebook computers. The device may have an embedded operating system or a user-installable operating system.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method comprising:
receiving a selection of a pre-stored resource allocation profile for guiding execution of a plurality of processes in a computing apparatus, wherein the resource allocation profile defines how to allocate processing resources for the plurality of processes and wherein the resource allocation profile defines a proportion of processing resources to allocate for at least two of an email application, a gaming application, a messaging application, a voice call application, and an internet protocol application;
executing processes in accordance with respective priorities defined in the pre-stored resource allocation profile defining execution priorities for each of a plurality of processes;
activating a pre-stored default resource allocation profile automatically in response to detecting that no pre-determined activation condition for other profiles exists; and
defining resource usage profiles automatically based upon a historical usage pattern of the computing apparatus.

2. The method of claim 1, further comprising:
activating a first user process that enables real-time interaction with a user of the computing apparatus;
activating a second user process that enables real-time interaction with a user of the computing apparatus;
activating a communication process that enables communication by the computing apparatus with a remote apparatus, and
defining execution priorities for at least one resource allocation profile wherein the first user process and the communication process have higher execution priorities than the second user process.

3. The method of claim 1, further comprising:
activating a user process that enables real-time interaction with a user of the computing apparatus;
activating a first communication process that enables communication by the computing apparatus with a remote apparatus;
activating a second communication process that enables communication by the computing apparatus with a remote apparatus, and
defining execution priorities for at least one resource allocation profile wherein the user process and the first communication process have higher execution priorities than the second communication process.

4. The method of claim 1, wherein at least two of the email application, the gaming application, the messaging application, the voice call application, and the internet protocol application are assigned a numerical priority, and wherein the processing resources allocated to the at least two applications are arranged to be approximately equal to a numerical priority of each of the at least two applications divided by the total numerical priorities of the at least two applications.

5. An apparatus comprising at least a processor, and a memory in communication with the processor and having computer coded instructions stored therein, said instructions when executed by the processor causing the apparatus to perform:
   receiving a selection of a pre-stored resource allocation profile for guiding execution of a plurality of processes in the apparatus, wherein the resource allocation profile defines how to allocate processing resources for the plurality of processes and wherein the resource allocation profile defines a proportion of processing resources to allocate for at least two of an email application, a gaming application, a messaging application, a voice call application, and an internet protocol application;
   executing processes in accordance with respective priorities defined in the pre-stored profile defining execution priorities for each of a plurality of processes;
   activating a pre-stored default resource allocation profile automatically in response to detecting that no pre-determined activation condition for other profiles exists; and
   defining resource usage profiles automatically based upon a historical usage pattern of the apparatus.

6. The apparatus of claim 5, further comprising instructions that cause the apparatus to perform:
   activating a first user process that enables real-time interaction with a user of the apparatus;
   activating a second user process that enables real-time interaction with a user of the apparatus;
   activating a communication process that enables communication by the apparatus with a remote apparatus, and
   defining execution priorities for at least one resource allocation profile wherein the first user process and the communication process have higher execution priorities than the second user process.

7. The apparatus of claim 5, further comprising instructions that cause the apparatus to perform:
   activating a user process that enables real-time interaction with a user of the computing apparatus;
   activating a first communication process that enables communication by the computing apparatus with a remote apparatus;
   activating a second communication process that enables communication by the computing apparatus with a remote apparatus, and
   defining execution priorities for at least one resource allocation profile wherein the user process and the first communication process have higher execution priorities than the second communication process.

8. The apparatus of claim 5, wherein at least two of the email application, the gaming application, the messaging application, the voice call application, and the internet protocol application are assigned a numerical priority, and wherein the processing resources allocated to the at least two applications are arranged to be approximately equal to a numerical priority of each of the at least two applications divided by the total numerical priorities of the at least two applications.

9. A computer program product comprising a computer readable memory storage device having computer coded instructions stored therein, said instructions when executed by the processor causing an apparatus to perform:
   receiving a selection of a pre-stored resource allocation profile for guiding execution of a plurality of processes in the apparatus, wherein the resource allocation profile defines how to allocate processing resources for the plurality of processes and wherein the resource allocation profile defines a proportion of processing resources to allocate for at least two of an email application, a gaming application, a messaging application, a voice call application, and an internet protocol application;
   executing processes in accordance with respective priorities defined in the pre-stored profile defining execution priorities for each of a plurality of processes;
   activating a pre-stored default resource allocation profile automatically in response to detecting that no pre-determined activation condition for other profiles exists; and
   defining resource usage profiles automatically based upon a historical usage pattern of the apparatus.

10. The computer program product of claim 9, further comprising instructions that cause the apparatus to perform:
    activating a first user process that enables real-time interaction with a user of the apparatus;
    activating a second user process that enables real-time interaction with a user of the apparatus;
    activating a communication process that enables communication by the apparatus with a remote apparatus, and
    defining execution priorities for at least one resource allocation profile wherein the first user process and the communication process have higher execution priorities than the second user process.

11. The computer program product of claim 9, further comprising instructions that cause the apparatus to perform:
    activating a user process that enables real-time interaction with a user of the computing apparatus;
    activating a first communication process that enables communication by the computing apparatus with a remote apparatus;
    activating a second communication process that enables communication by the computing apparatus with a remote apparatus, and
    defining execution priorities for at least one resource allocation profile wherein the user process and the first communication process have higher execution priorities than the second communication process.

12. The computer program product of claim 9, wherein at least two of the email application, the gaming application, the messaging application, the voice call application, and the internet protocol application are assigned a numerical priority, and wherein the processing resources allocated to the at least two applications are arranged to be approximately equal to a numerical priority of each of the at least two applications divided by the total numerical priorities of the at least two applications.

* * * * *